United States Patent
Jacob et al.

(10) Patent No.: US 9,350,280 B2
(45) Date of Patent: May 24, 2016

(54) METHOD FOR OPERATING A POWER SUPPLY UNIT FOR AN ELECTRICAL SYSTEM OF A MOTOR VEHICLE

(71) Applicant: ROBERT BOSCH GMBH, Stuttgart (DE)

(72) Inventors: Andreas Jacob, Stuttgart (DE); Sebastian Jansen, Ludwigsburg (DE); Marc Eschenhagen, Möglingen (DE); Axel Reuter, Vaihingen an der Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/358,460

(22) PCT Filed: Nov. 6, 2012

(86) PCT No.: PCT/EP2012/071913
§ 371 (c)(1),
(2) Date: May 15, 2014

(87) PCT Pub. No.: WO2013/075935
PCT Pub. Date: May 30, 2013

(65) Prior Publication Data
US 2015/0035500 A1      Feb. 5, 2015

(30) Foreign Application Priority Data

Nov. 21, 2011   (DE) .................. 10 2011 086 734

(51) Int. Cl.
*H02P 3/00*      (2006.01)
*H02P 9/06*      (2006.01)
(Continued)

(52) U.S. Cl.
CPC . *H02P 9/08* (2013.01); *B60L 11/14* (2013.01); *B60L 15/20* (2013.01); *F02N 11/087* (2013.01); *H02J 7/163* (2013.01); *B60L 2210/30* (2013.01); *B60L 2210/40* (2013.01); *B60L 2220/14* (2013.01); *B60L 2240/421* (2013.01); *F02N 11/04* (2013.01); *F02N 11/0862* (2013.01); *F02N 2011/0885* (2013.01);
(Continued)

(58) Field of Classification Search
USPC .............................................. 322/10; 290/31
See application file for complete search history.

(56) References Cited

U.S. PATENT DOCUMENTS 3,902,073 A * 8/1975 Lafuze ............................ 290/46
4,093,869 A * 6/1978 Hoffmann et al. .............. 290/31
(Continued)

FOREIGN PATENT DOCUMENTS

CN          1230962 C    12/2005
CN        101790841 A     7/2010
(Continued)

*Primary Examiner* — Pedro J Cuevas
(74) *Attorney, Agent, or Firm* — Norton Rose Fulbright US LLP

(57) ABSTRACT

A method for operating a power supply unit for an electrical system of a motor vehicle, the power supply unit having an electric generator having a stator having a stator winding and a rotor having a rotor winding, as well as a field current controller assigned to the rotor winding for selecting the setpoint of the current flowing through the rotor winding; the electric generator being set into rotation without a current being specified by the rotor winding, thereby generating a starting voltage; at least one component of the power supply unit or of the vehicle electrical system being energized by the starting voltage.

11 Claims, 2 Drawing Sheets

(51) Int. Cl.
- *H02P 15/00* (2006.01)
- *H02P 9/08* (2006.01)
- *B60L 11/14* (2006.01)
- *B60L 15/20* (2006.01)
- *F02N 11/08* (2006.01)
- *H02J 7/16* (2006.01)
- *F02N 11/04* (2006.01)
- *H02K 23/52* (2006.01)
- *H02P 9/04* (2006.01)
- *H02P 9/00* (2006.01)

(52) U.S. Cl.
CPC ........ *H02P 2009/002* (2013.01); *Y02T 10/642* (2013.01); *Y02T 10/70* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 4,409,539 A | 10/1983 | Nordbrock et al. | |
| 4,746,850 A * | 5/1988 | Abbondanti | 318/723 |
| 4,763,058 A * | 8/1988 | Heining et al. | 318/807 |
| 4,841,216 A * | 6/1989 | Okada et al. | 322/10 |
| 5,036,267 A * | 7/1991 | Markunas et al. | 322/10 |
| 5,055,764 A * | 10/1991 | Rozman et al. | 322/10 |
| 5,068,590 A * | 11/1991 | Glennon et al. | 322/10 |
| 6,847,194 B2 * | 1/2005 | Sarlioglu et al. | 322/10 |
| 7,064,513 B2 * | 6/2006 | Fenley | 318/700 |
| 7,508,086 B2 * | 3/2009 | Huang et al. | 290/31 |
| 7,821,145 B2 * | 10/2010 | Huang et al. | 290/31 |
| 8,073,600 B2 * | 12/2011 | Kaneko et al. | 701/54 |
| 8,773,081 B2 * | 7/2014 | Akita et al. | 322/28 |
| 2004/0057257 A1 * | 3/2004 | Sarlioglu et al. | 363/49 |
| 2005/0073279 A1 * | 4/2005 | Fenley | 318/717 |
| 2007/0222220 A1 * | 9/2007 | Huang et al. | 290/31 |
| 2009/0071735 A1 * | 3/2009 | Kaneko et al. | 180/65.285 |
| 2009/0174188 A1 * | 7/2009 | Huang et al. | 290/46 |
| 2012/0146593 A1 * | 6/2012 | Akita et al. | 322/10 |
| 2014/0265332 A1 * | 9/2014 | Jaros et al. | 290/48 |

FOREIGN PATENT DOCUMENTS

| | | |
|---|---|---|
| EP | 1630413 A1 | 3/2006 |
| FR | 2 910 191 | 6/2008 |

* cited by examiner

300

---

GENERATING A STARTING VOLTAGE BY SETTING THE ELECTRIC GENERATOR INTO ROTATION WITHOUT A CURRENT BEING SPECIFIED BY A ROTOR WINDING, THE ELECTRIC GENERATOR HAVING A STATOR HAVING A STATOR WINDING AND A ROTOR HAVING THE ROTOR WINDING.                                                                 301

↓

SELECTING, VIA A FIELD CURRENT CONTROLLER ASSIGNED TO THE ROTOR WINDING, A SETPOINT OF A CURRENT FLOWING THROUGH THE ROTOR WINDING.                                                                 302

↓

ENERGIZING, BY THE STARTING VOLTAGE, AT LEAST ONE COMPONENT OF THE POWER SUPPLY UNIT OR OF THE VEHICLE ELECTRICAL SYSTEM.                                                                 303

↓

CONNECTING THE POWER SUPPLY UNIT, WHICH IS INITIALLY DISCONNECTED FROM THE VEHICLE ELECTRICAL SYSTEM, TO THE VEHICLE ELECTRICAL SYSTEM WHEN THE STARTING VOLTAGE EXCEEDS A LOWER THRESHOLD VALUE.                                                                 304

FIGURE 3

METHOD FOR OPERATING A POWER SUPPLY UNIT FOR AN ELECTRICAL SYSTEM OF A MOTOR VEHICLE

FIELD OF THE INVENTION

The present invention relates to a method for operating a power supply unit for an electrical system of a motor vehicle, as well as to a processing unit for implementing the same.

BACKGROUND INFORMATION

In power supply units for an electrical system of a motor vehicle, claw-pole generators having electrical excitation can be used as electric generators ("dynamo;" normally an alternating-current generator; however, the use of direct-current generators is also known). In this case, a torque driving the generator is applied by the internal combustion engine via a mechanical coupling (for example, a belt). The current propagating through the rotor winding is used as a manipulated variable for regulating the on-board voltage and is specified by an assigned field current controller. The control prevents greatly fluctuating voltage values, for example, that could potentially damage the downstream electrical system, from being supplied by the generator in response to widely varying engine speeds. Normally, a controllable electronic switch (for example, a MOSFET) and a corresponding logic circuit select the setpoint for the current that propagates through the rotor winding.

Rectifier circuits can be used to obtain the DC voltage required for the vehicle electrical system from the polyphase AC voltage of the generator. Bridge rectifiers including diodes or switchable rectifier elements (for example, MOSFETs) controlled by a logic circuit can be used in this case.

One or a plurality of capacitors in the intermediate circuit (DC link capacitors) can be used for smoothing the voltage ripple created by the rectifiers. These capacitors are dimensioned to be sufficiently large in order to achieve a DC voltage that is as free as possible of ripple voltage, even under high energy system loads.

During operation, the vehicle electrical system is electrically powered by the power supply unit. Components of the power supply unit itself, such as the rotor winding, the mentioned logic circuits (for example, the field current controller, the rectifier logic), for example, the mentioned switches or the DC link capacitors that are electrically powered, are also considered within the context of the present invention to be vehicle electrical system components that are to be energized.

If the generator is not in operation, the vehicle electrical system is powered by a vehicle battery. During initial start-up of the power supply unit, the rotor winding, the logic circuits, the electronic switches, the DC link capacitors, etc., are fed by the vehicle battery. Problematic here, in particular, is the feeding of the DC link capacitors, for the following reasons.

Since leakage currents across the DC link capacitors are to be avoided upon standstill of the generator, they are typically isolated from the vehicle electrical system in such a case. Therefore, high enough currents occur briefly upon switching of the DC link capacitors into the vehicle electrical system, until the DC link capacitors are charged. These currents can lead to damage to individual or to a plurality of components in the vehicle electrical system. However, a suitable charge state must be ensured for the DC link capacitors to enable the power supply unit to be used.

Possible options for limiting the inrush current of the DC link capacitors include the series connection of an ohmic or inductive load, clocking of the voltage present at the DC link capacitors, the series connection of a current-regulating transistor, an adapted dimensioning of all components of the vehicle electrical system, to prevent damage caused by the high charging current, and/or using a DC voltage converter to regulate the charging current and the charging voltage.

In practice, however, the possible options for operating such power supply units prove to be somewhat complicated, expensive and/or ineffective. Therefore, there continues to be a need for improvements.

SUMMARY OF THE INVENTION

The present invention provides a method for operating a power supply unit for a vehicle electrical system, as well as a processing unit for implementing the same as defined by the features of the descriptions herein. Advantageous embodiments constitute the subject matter of the corresponding further descriptions herein, as well as of the following description.

The present invention makes use of a magnetic remanence of the rotor (in particular of the winding core) to generate a starting voltage without external excitation (i.e., without current propagating through the rotor winding) and to power components in the vehicle electrical system. The starting voltage is particularly suited for charging DC link capacitors, for feeding the rotor winding, the field current controller, logic circuits and electronic switches, in order to thereby transfer the power supply unit to normal operation. In particular, this renders possible an emergency operation, for example, when the vehicle battery is discharged. The level of the starting voltage is regulated, in particular, as a function of the speed selection.

This approach is, in fact, similarly known from shunt-wound machines. However, the generators used in motor vehicles are not shunt-wound machines, so that the use of remanence is not necessarily self-evident here.

The power supply unit may have a direct-current generator or an alternating-current generator having a downstream rectifier. However, due to the growing demand for electrical power in the vehicle, efforts to reduce fuel consumption and to lower emissions, as well as the desire to be able to combine the advantages of an electromotor with those of an internal combustion engine, electrical machines having a dual function, what are generally referred to as starter generators, are also being increasingly used. Power supply units having these types of electrical machines also benefit from the measures provided in accordance with the present invention.

Power supply units having generators, where the rotor is equipped with a winding and additional permanent magnets, what are generally referred to as auxiliary magnets, may be operated in accordance with the present invention. Auxiliary magnets are used for increasing the electrical power output of a generator. They automatically lead to a remanence of the rotor.

By utilizing the magnetic remanence, the present invention makes it possible for an autonomous energy source to be provided in a vehicle that may function independently of other energy sources. By adjusting a sufficient speed, such an autonomous energy source may be used for supplying the power electronics, for example, a generator or rectifier, or for precharging the capacitors in the network of the power supply unit. Thus, a number of advantages are derived in accordance with the present invention:

The operating voltage for the logic section of the power electronics of a power supply unit, in particular for the rectifier, may be provided in accordance with the present invention without a further energy source.

The capacitors of a power supply unit (for example, DC link capacitors), or in the downstream load network (for example, in the electrical steering) may be precharged in accordance with the present invention without further power sources.

Other peripheral devices within and connected in outgoing circuit from the power supply unit (for example, parts of the power electronics or consumers in the network of the power supply unit) may be powered by the energy produced in accordance with the present invention.

The need is eliminated for additional voltage sources for powering components of the power supply unit.

Even in the event of failure of the power sources mentioned in the related art, the power supply unit according to the present invention is still available under the condition of a sufficient speed.

Special advantages are derived in systems having a DC link capacitor, as previously explained. Such a DC link capacitor may be precharged, particularly upon starting of a corresponding motor and the associated generator, even without using other power sources. Therefore, there is no need for a DC link capacitor to remain connected to the vehicle battery to ensure a suitable charge state, making it possible to prevent potentially occurring leakage currents that could cause the battery to discharge.

The DC link capacitor may be precharged during motor run-up and, only then, when a charge state is sufficient, be connected to the downstream vehicle electrical system. This prevents high inrush currents. In particular, this makes superfluous the precharging of such a DC link capacitor via a DC voltage converter, as previously explained. The probability of vehicle failure is hereby reduced. The measures provided in accordance with the present invention make it possible to economize on additional components, such as resistors, transistors and/or coils, for charging a DC link capacitor, thereby leading to a cost saving. The precharging by way of the starting voltage produced in accordance with the present invention may also be carried out in parallel and/or in addition to previously known options for limiting charging current, thereby ensuring an enhanced fault tolerance due to redundancy effects. Thus, the present invention makes it possible to avoid high currents upon connecting of a vehicle electrical system to a power supply unit and, thus, damage to components in the vehicle electrical system caused by high charging currents.

The elucidated method steps may be performed during a selective control of transistors upon use of an active rectification, whereby a boost mode may be realized. This makes it possible, by using the described principle, to allow the voltage to increase even more rapidly than in the case of a passive rectification. This is especially advantageous for the precharging of a DC link capacitor.

A processing unit according to the present invention, for example, a corresponding control unit of a motor vehicle, is adapted, in particular in terms of software engineering, for implementing a method according to the present invention.

A software implementation of the method is also advantageous since this entails especially low costs, particularly when a control unit to be realized is also used for other tasks and, for that reason, is already present. Suitable data media for providing the computer program include, in particular, diskettes, hard drives, flash memories, EEPROMs, CD ROMs, DVDs, inter alia. A program may also be downloaded over computer networks (Internet, intranet, etc.).

Other advantages and embodiments of the present invention are derived from the description and the appended drawing.

It is understood that the aforementioned features and those which are still to be explained in the following may be used not only in the particular stated combination, but also in other combinations or alone, without departing from the scope of the present invention.

The present invention is schematically illustrated in the drawing with reference to an exemplary embodiment and is described in detail in the following with reference to the drawings.

BRIEF DESCRIPTION OF THE DRAWING

FIG. 3 shows the method 300 for operating a power supply unit for an electrical system of a motor vehicle, the power supply unit including an electric generator. The method 300 includes operations/tasks 301, 302, 303, and 304.

DETAILED DESCRIPTION

Figure 1:
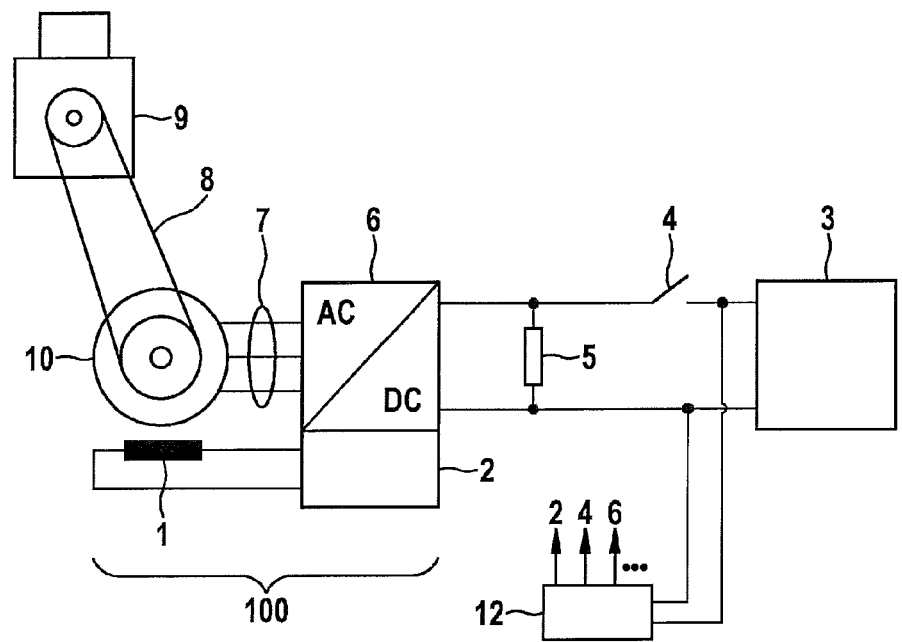
FIG. 1 shows a vehicle electrical system having a power supply unit that may be configured and/or operated in accordance with a specific embodiment of the present invention.

FIG. 1 shows a vehicle electrical system of a motor vehicle having a power supply unit 100 that may be configured and/or operated in accordance with a specific embodiment of the present invention. Power supply unit 100 includes an electrical machine 10, an externally excited synchronous generator being assumed in the following, for example. The electrical machine is operated via an internal combustion engine 9 and, to this end, is coupled via a corresponding coupling arrangement, for example, a mechanical coupling 8 in the form of a belt drive, to internal combustion engine 9. Electrical machine 10 is electrically connected to a rectifier 6, a plurality of phase connections 7 being provided in correspondence with the number of phases provided by electrical machine 10. On the DC voltage side, a rotor winding 1 is connected via a field current controller 2 to electrical machine 10. Field current controller 2 is responsible for controlling rotor winding 1 and for a potentially existing active rectification in rectifier 6. Via a switching element 4, an energy accumulator 3, for example, the vehicle battery, may be connected to the DC voltage side of rectifier 6 and disconnected therefrom. At least one consumer 5 is integrated on the DC voltage side of rectifier 6. In the same way, consumers are provided that are disconnectable from and connectable to the power supply unit via switching element 4.

A processing unit 12, which is adapted in terms of software engineering for implementing the present invention, is provided in the vehicle electrical system. In particular, it controls field current controllers 2, switches 4, rectifiers 6, etc., in accordance with the present invention. As illustrated in FIG. 1, the processing unit may be supplied by energy accumulators 3; equally, however, also via another energy accumulator provided in the system (for example, having a voltage condition that deviates from that of energy accumulator 3).

The present invention starts out from a situation where the rotor winding is not energized, for example, when electrical machine 10 is at a standstill. In this case, switching element 4 is initially open, so that the power supply unit is disconnected from the vehicle electrical system. Nevertheless, the rotor, in particular the armature thereof, has a magnetic remanence that already suffices for generating a starting voltage during start-up of the generator, without a current being specified by the rotor winding. The starting voltage, in turn, may be utilized quite advantageously for transferring the power supply unit itself to normal operation, in that rectifier 6 is initially powered by the starting voltage, for example. There is no need to use voltages from the vehicle electrical system for supplying power; where indicated, corresponding components may be dimensioned to be smaller or altogether economized. The level of the starting voltage may be influenced by the speed. The magnetic flux density may be increased by additionally providing the rotor of electrical machine 10 with ferromagnetic materials, and the speed required for a specific electric voltage thereby reduced.

If a specific voltage level (for example, 12 V) is reached on the DC voltage side of rectifier 6, next, for example, field current controller 2 (and thus rotor winding 1) may be powered. From this point in time on, power supply unit 100 is in normal operation, and existing further electronic consumers 5 may be powered in the vehicle electrical system. At this point, switching element 4 may also be closed to connect power supply unit 100 to the remainder of the vehicle electrical system.

If an initial state is assumed, in which a partial excitation of rotor winding 1 is present, the function is comparable to those previously described. However, the induced voltage in the phases of the stator is greater at the beginning of the observation due to the superposition of the mentioned effects (remanence in the rotor, as well as excitation present in the rotor winding). Therefore, a desired voltage level may be reached more quickly.

Figure 2:
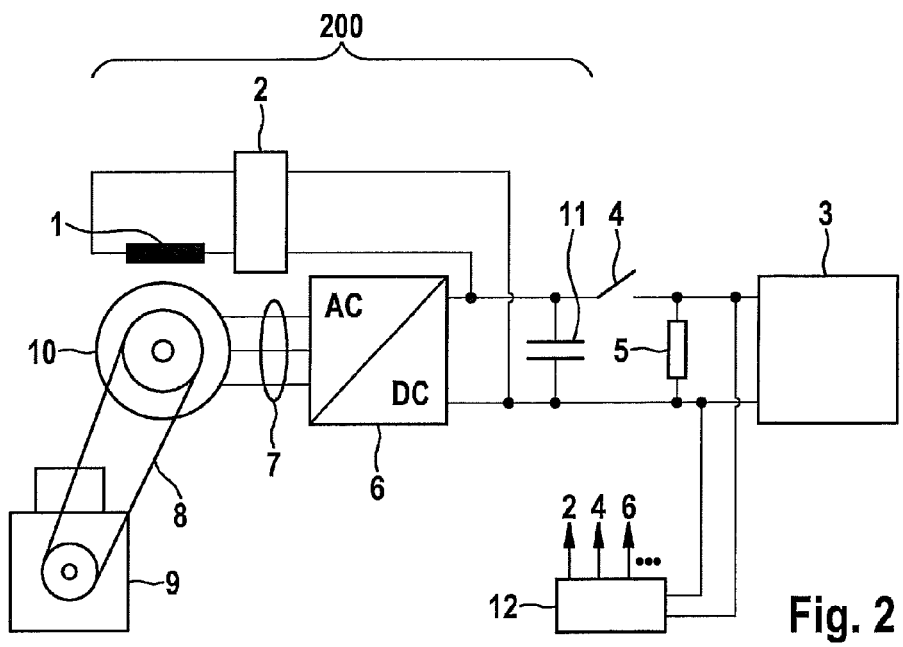
FIG. 2 shows a vehicle electrical system having a power supply unit that may be configured and/or operated in accordance with another specific embodiment of the present invention.

FIG. 2 shows a vehicle electrical system having a power supply unit 200 that may be configured and/or operated in accordance with a specific embodiment of the present invention. The precharging of a DC link capacitor 11 is described, in particular, with reference to FIG. 2.

The elements essentially correspond to those of previously described FIG. 1; field current controller 2 being described separately from rectifier 6 in the present case, however.

If there is a complete de-excitation of rotor winding 1, an initially still low voltage is induced across the phases of the stator by the remanence of the rotor and is output via phase conductors 7. Via a corresponding rectifier circuit 6 (to the extent possible, for example, passively across diodes, actively across transistor, or a combination thereof), a starting voltage is generated across DC link capacitor(s) 11, resulting in a charging current of DC link capacitor 11 that is dependent on the magnitude of the voltage. In addition, the starting voltage may also be used for energizing field current controller 2 and rotor winding 1. On the other hand, at the same speed, the resulting excitation current increases the induced voltage across the phases of the stator, and the starting voltage, which, in turn, leads to a higher excitation current, etc. Finally, if the starting voltage across the DC link capacitor corresponds to a desired voltage level, for example, to the nominal voltage or the charging voltage of energy accumulator 3, switching element 4 may be closed without undesirably high currents flowing across switching element 4. The voltage across DC link capacitor 11 may be adjusted to the desired level through a speed setpoint selection, by field current controller 2 regulating the excitation current, and/or by the switching elements in rectifier 6 being controlled accordingly (in particular, by way of the boost mode explained above).

If rotor winding 1 is completely or partially excited, electrical machine 10 may also be motor-driven by the feeding of current to the stator, accordingly.

What is claimed is:

1. A method for operating a power supply unit for an electrical system of a motor vehicle, the power supply unit including an electric generator, the method comprising:
   generating a starting voltage by setting the electric generator into rotation without a current being specified by a rotor winding, the electric generator having a stator having a stator winding and a rotor having the rotor winding;
   selecting, via a field current controller assigned to the rotor winding, a setpoint of a current flowing through the rotor winding;
   energizing, by the starting voltage, at least one component of the power supply unit or of the vehicle electrical system; and
   connecting the power supply unit, which is initially disconnected from the vehicle electrical system, to the vehicle electrical system when the starting voltage exceeds a lower threshold value.

2. The method of claim 1, wherein the level of the starting voltage is adjusted by at least one of setting a speed of the electrical machine, appropriately controlling the rectifier, and appropriately controlling the field current controller.

3. The method of claim 1, wherein as a component of the power supply unit or of the vehicle electrical system, at least one of the field current controller, the rotor winding, a rectifier, a power consumer, and at least one DC link capacitor is supplied with starting voltage.

4. The method of claim 1, wherein the method is implemented upon initial start-up of the power supply unit.

5. A computer readable medium having a computer program, which is executable by a processor, comprising:
   a program code arrangement having program code for operating a power supply unit for an electrical system of a motor vehicle, the power supply unit including an electric generator, by performing the following:
      generating a starting voltage by setting the electric generator into rotation without a current being specified by a rotor winding, the electric generator having a stator having a stator winding and a rotor having the rotor winding;
      selecting, via a field current controller assigned to the rotor winding, a setpoint of a current flowing through the rotor winding;
      energizing, by the starting voltage, at least one component of the power supply unit or of the vehicle electrical system; and
      connecting the power supply unit, which is initially disconnected from the vehicle electrical system, to the vehicle electrical system when the starting voltage exceeds a lower threshold value.

6. A processing unit, comprising:
   a processing arrangement configured for operating a power supply unit for an electrical system of a motor vehicle, the power supply unit including an electric generator, by performing the following:
      generating a starting voltage by setting the electric generator into rotation without a current being specified by a rotor winding, the electric generator having a stator having a stator winding and a rotor having the rotor winding;
      selecting, via a field current controller assigned to the rotor winding, a setpoint of a current flowing through the rotor winding;
      energizing, by the starting voltage, at least one component of the power supply unit or of the vehicle electrical system; and
      connecting the power supply unit, which is initially disconnected from the vehicle electrical system, to the vehicle electrical system when the starting voltage exceeds a lower threshold value.

7. A power supply unit for an electrical system of a motor vehicle, comprising:
an electric generator including a stator having a stator winding and a rotor having a rotor winding;
a field current controller assigned to the rotor winding for selecting a setpoint of the current flowing through the rotor winding; and
a processing unit configured for operating a power supply unit for an electrical system of a motor vehicle, the power supply unit including an electric generator, by performing the following:
generating a starting voltage by setting the electric generator into rotation without a current being specified by the rotor winding;
selecting, via the field current controller assigned to the rotor winding, the setpoint of the current flowing through the rotor winding;
energizing, by the starting voltage, at least one component of the power supply unit or of the vehicle electrical system; and
connecting the power supply unit, which is initially disconnected from the vehicle electrical system, to the vehicle electrical system when the starting voltage exceeds a lower threshold value.

8. The power supply unit of claim 7, further comprising:
a rectifier having rectifier elements for rectifying phase voltages generated by the electric generator.

9. The power supply unit of claim 7, wherein the rotor includes at least one permanent magnet.

10. The power supply unit of claim 7, further comprising:
a switching element to disconnect the power supply unit from the remainder of the vehicle electrical system.

11. The power supply unit of claim 7, wherein the level of the starting voltage is adjusted by at least one of setting a speed of the electrical machine, appropriately controlling the rectifier, and appropriately controlling the field current controller.

* * * * *